United States Patent
Oh et al.

(10) Patent No.: US 11,035,312 B2
(45) Date of Patent: Jun. 15, 2021

(54) APPARATUS FOR DIAGNOSING EGR VALVE AND METHOD THEREOF

(71) Applicants: HYUNDAI MOTOR COMPANY, Seoul (KR); KIA MOTORS CORPORATION, Seoul (KR)

(72) Inventors: Heechang Oh, Suwon-si (KR); Dong Hee Han, Seongnam-si (KR); Hyunjin Kang, Hwaseong-si (KR); Kwanhee Lee, Suwon-si (KR); Yeongseop Park, Seoul (KR); Seungwoo Hong, Seoul (KR); Jonghyeok Lee, Hwaseong-si (KR); Yong Kak Choi, Seoul (KR)

(73) Assignees: HYUNDAI MOTOR COMPANY, Seoul (KR); KIA MOTORS COMPANY, Seoul (KR)

( * ) Notice: Subject to any disclaimer, the term of this patent is extended or adjusted under 35 U.S.C. 154(b) by 0 days.

(21) Appl. No.: 16/895,240

(22) Filed: Jun. 8, 2020

(65) Prior Publication Data

US 2021/0148298 A1 May 20, 2021

(30) Foreign Application Priority Data

Nov. 20, 2019 (KR) .......................... 10-2019-0149866

(51) Int. Cl.
| | |
|---|---|
| *F02D 41/22* | (2006.01) |
| *F02D 41/00* | (2006.01) |
| *F02M 26/21* | (2016.01) |
| *F02M 26/09* | (2016.01) |
| *F02B 39/10* | (2006.01) |
| *F02B 37/12* | (2006.01) |
| *F02D 41/24* | (2006.01) |

(52) U.S. Cl.
CPC .............. *F02D 41/22* (2013.01); *F02B 37/12* (2013.01); *F02B 39/10* (2013.01); *F02D 41/005* (2013.01); *F02D 41/0072* (2013.01); *F02D 41/0077* (2013.01); *F02D 41/2451* (2013.01); *F02M 26/09* (2016.02); *F02M 26/21* (2016.02); *F02D 2200/0406* (2013.01)

(58) Field of Classification Search
CPC .... F02D 41/22; F02D 41/0077; F02D 41/005; F02D 41/2451; F02D 41/0072; F02D 2200/0406; F02B 37/12; F02B 39/10; F02M 26/09; F02M 26/21; F02M 26/49
USPC ........... 123/568.16; 701/107, 108; 73/114.74
See application file for complete search history.

(56) References Cited

U.S. PATENT DOCUMENTS

| | | | |
|---|---|---|---|
| 9,328,679 B2 * | 5/2016 | Clark | F02D 41/2474 |
| 2017/0305415 A1 * | 10/2017 | Dudar | F02D 41/042 |

* cited by examiner

*Primary Examiner* — Hai H Huynh
(74) *Attorney, Agent, or Firm* — Brinks Gilson & Lione

(57) ABSTRACT

An apparatus for diagnosing an exhaust gas recirculation (EGR) valve includes: an EGR apparatus including an EGR line connecting an exhaust line and an intake line and an EGR valve installed in the EGR line; an electric supercharger installed in the intake line to change an internal pressure of an intake manifold; a manifold pressure sensor measuring the internal pressure of the intake manifold; and a controller that when an engine is stopped while a vehicle is running, learns on an amount of opening of the EGR valve, diagnoses a fixation of the EGR valve and e a leakage of the EGR valve based on the internal pressure of the intake manifold detected by the manifold pressure sensor.

21 Claims, 10 Drawing Sheets

APPARATUS FOR DIAGNOSING EGR VALVE AND METHOD THEREOF

CROSS-REFERENCE TO RELATED APPLICATION

This application claims priority to and the benefit of Korean Patent Application No. 10-2019-0149866, filed on Nov. 20, 2019, the entire contents of which are incorporated herein by reference.

FIELD

The present disclosure relates to an apparatus for diagnosing an EGR valve and method thereof.

BACKGROUND

The statements in this section merely provide background information related to the present disclosure and may not constitute prior art.

An exhaust gas recirculation (EGR) apparatus is a system employed in a vehicle to reduce noxious exhaust gas. In general, an amount of NOx in exhaust gas increases when the ratio of air in the air/fuel mixture is high. Therefore, the exhaust gas recirculation apparatus feeds a part (e.g., 5 to 20%) of the exhaust gas exhausted from an engine back to the air/fuel mixture to reduce an oxygen concentration in the air/fuel mixture, and thereby suppresses generation of the NOx by interfering with combustion.

Typically, the exhaust gas recirculation apparatus recirculates an exhaust gas that is exhausted from cylinders of the engine through an exhaust manifold and flows through an exhaust line, back to the cylinders of the engine through a recirculation line. An EGR valve is typically employed in the recirculation line to adjust an EGR ratio.

The exhaust gas recirculation system may be classified into a low pressure EGR (LP EGR) apparatus and a high pressure EGR (HP EGR) apparatus.

The high pressure EGR apparatus supplies the recirculation gas (EGR gas) to the intake manifold by using a high pressure of the exhaust manifold. The low pressure EGR apparatus supplies the recirculation gas from a downstream side of exhaust gas purifier in the exhaust line to an upstream side of a compressor of the turbocharger in the intake line.

In such a conventional exhaust gas recirculation system, the exhaust gas recirculates through an EGR line that is branched from the exhaust line and joined to the intake line. The EGR line is provided with an EGR cooler for cooling the recirculated exhaust gas and an EGR valve for adjusting an amount of the recirculated exhaust gas.

We have discovered that since an actual EGR amount controlled by the opening of the EGR valve is difficult to detect, and a method capable of precisely predicting or diagnosing operation and opening of the EGR valve is required to improve the NOx control.

The above information disclosed in this Background section is only for enhancement of understanding of the background of the present disclosure and therefore it may contain information that does not form the prior art that is already known to a person of ordinary skill in the art.

SUMMARY

The present disclosure provides an apparatus for diagnosing an EGR valve and a method using the same having advantages of precisely diagnosing normal operation and opening of the EGR valve of the exhaust gas recirculation apparatus.

An exemplary apparatus for diagnosing an EGR valve includes: an exhaust gas recirculation apparatus including an EGR line connecting an exhaust line and an intake line of an engine, and an EGR valve installed in the EGR line; an electric supercharger installed in the intake line and configured to change an internal pressure of an intake manifold; a manifold pressure sensor measuring the internal pressure of the intake manifold; and a controller configured to, when the engine is stopped while a vehicle is running, learn on an amount of opening of the EGR valve, diagnose a fixation of the EGR valve and a leakage of the EGR valve based the measured internal pressure of the intake manifold which varies according to the amount of opening of the EGR valve.

The controller may be configured to learn on the amount of opening of the EGR valve, diagnose the fixation of the EGR valve and the leakage of the EGR valve after positioning a crank angle to a reference position when the engine is stopped.

In one form, the controller may operate the electric supercharger in a positive direction to generate a positive pressure above an atmospheric pressure in the intake manifold, open the EGR valve for a first predetermined period with a first predetermined opening amount and then close the EGR valve when the first predetermined period expires, and calculate a first pressure difference by comparing an internal pressure of the intake manifold measured during the first predetermined period with a first reference pressure, such that the controller learns on the amount of opening of the EGR valve.

In another form, the controller may be configured to: open the EGR valve for a second predetermined period with a second predetermined opening amount and then close the EGR valve after the second predetermined period expires, where the second predetermined opening amount is different from the first predetermined opening amount, calculate a second pressure difference by comparing an internal pressure of the intake manifold measured during the second predetermined period with a second reference pressure, calculate a ratio of the first pressure difference to the second pressure difference, and determine a compensation value of the opening of the EGR valve based on the calculated ratio of the first pressure difference to the second pressure difference.

The controller may be configured to determine that the EGR valve is fixated when the internal pressure of the intake manifold detected from the manifold pressure sensor is not varied while the electric supercharger is operated in a positive direction to generate a positive pressure above an atmospheric pressure in the intake manifold and an instruction to open the EGR valve to different amounts of opening is sent.

The controller may be configured to determine that the EGR valve leaks when the internal pressure of the intake manifold detected from the manifold pressure sensor differs from a reference pressure by more than a predetermined pressure while the electric supercharger is operated in a positive direction to generate a positive pressure above an atmospheric pressure in the intake manifold and an instruction to open the EGR valve to different amounts of opening is sent.

The controller may be configured to learn the opening of the EGR valve by operating the electric supercharger in a reverse direction to generate a negative pressure below an atmospheric pressure in the intake manifold, closing the EGR valve after opening the EGR valve for a first predetermined period to a first predetermined opening amount, and comparing the internal pressure of the intake manifold with a first reference pressure.

The controller may be configured to send an instruction to close the EGR valve after sending an instruction to open the EGR valve for a first predetermined period to a second predetermined opening amount different from the first predetermined opening amount, compare the internal pressure of the intake manifold with a second reference pressure, and determine a compensation value of the opening of the EGR valve as a ratio of a differential pressure between the first reference pressure and the internal pressure of the intake manifold measured when an instruction to open the EGR valve to the first predetermined opening amount is sent and a differential pressure between the second reference pressure and the internal pressure of the intake manifold measured when an instruction to open the EGR valve to the second predetermined opening amount is sent.

The controller may be configured to determine that the EGR valve is fixated when the internal pressure of the intake manifold detected from the manifold pressure sensor is not varied while the electric supercharger is operated in a reverse direction to generate a negative pressure below an atmospheric pressure in the intake manifold and an instruction to open the EGR valve to different amounts of opening is sent.

The controller may be configured to determine that the EGR valve leaks when the internal pressure of the intake manifold detected from the manifold pressure sensor differs from a reference pressure by more than a predetermined pressure while the electric supercharger is operated in a reverse direction to generate a negative pressure below an atmospheric pressure in the intake manifold and an instruction to open the EGR valve to different amounts of opening is sent.

An exemplary method for diagnosing an EGR valve provided in an exhaust gas recirculation apparatus includes determining, by a controller, whether an engine is stopped while a vehicle is running, operating, by the controller, an electric supercharger, detecting, by a manifold pressure sensor, an internal pressure of an intake manifold according to an opening of the EGR valve, and learning, by the controller, the opening of the EGR valve from the internal pressure of the intake manifold detected by the manifold pressure sensor.

The exemplary method may further include operating the electric supercharger in a positive direction to generate a positive pressure above an atmospheric pressure in the intake manifold, sending an instruction to open the EGR valve for a predetermined period to a first predetermined amount, sending an instruction to close the EGR valve, and learning the opening of the EGR valve by comparing the internal pressure of the intake manifold with a first reference pressure.

The exemplary method may further include: sending an instruction to open the EGR valve for a predetermined period to a second predetermined amount different from the first predetermined amount, sending an instruction to close the EGR valve, and comparing the internal pressure of the intake manifold with a second reference pressure, and determining a compensation value of the opening of the EGR valve as a ratio of a differential pressure between the first reference pressure and the internal pressure of the intake manifold measured when an instruction to open the EGR valve to the first predetermined amount is sent and a differential pressure between the second reference pressure and the internal pressure of the intake manifold measured when an instruction to open the EGR valve to the second predetermined amount.

The exemplary method may further include operating the electric supercharger in a reverse direction to generate a negative pressure below an atmospheric pressure in the intake manifold, sending an instruction to open the EGR valve for a predetermined period to a first predetermined amount, sending an instruction to close the EGR valve, and learning the opening of the EGR valve by comparing the internal pressure of the intake manifold with a first reference pressure.

The exemplary method may further include sending an instruction to open the EGR valve for a predetermined period to a second predetermined amount different from the first predetermined amount, sending an instruction to close the EGR valve, and comparing the internal pressure of the intake manifold with a second reference pressure, and determining a compensation value of the opening of the EGR valve as a ratio of a differential pressure between the first reference pressure and the internal pressure of the intake manifold measured when an instruction to open the EGR valve to the first predetermined amount is sent and a differential pressure between the second reference pressure and the internal pressure of the intake manifold measured when an instruction to open the EGR valve to the second predetermined amount.

Another exemplary method for diagnosing an EGR valve provided in an exhaust gas recirculation apparatus includes determining, by a controller, whether an engine is stopped and a diagnosis-required condition and a learning-available condition are satisfied, operating, by the controller, an electric supercharger, detecting, by a manifold pressure sensor, an internal pressure of an intake manifold according to an opening of the EGR valve, and determining, by the controller, a fixation of the EGR valve from the internal pressure of the intake manifold detected by the manifold pressure sensor.

The exemplary method may further include operating the electric supercharger in a positive direction to generate a positive pressure above an atmospheric pressure in the intake manifold, sending an instruction to open the EGR valve to an opening of a different size, stopping the electric supercharger, sending an instruction to close the EGR valve, and determining that the EGR valve is fixated when the internal pressure of the intake manifold detected from the manifold pressure sensor is not varied in the case that an instruction to open the EGR valve to an opening of a different size is sent.

The exemplary method may further include operating the electric supercharger in a reverse direction to generate a negative pressure below an atmospheric pressure in the intake manifold, sending an instruction to open the EGR valve to an opening of a different size, stopping the electric supercharger, sending an instruction to close the EGR valve, and determining that the EGR valve is fixated when the internal pressure of the intake manifold detected from the manifold pressure sensor is not varied in the case that an instruction to open the EGR valve to an opening of a different size is sent.

A still another exemplary method for diagnosing an EGR valve provided in exhaust gas recirculation apparatus includes determining, by the controller, whether an engine is stopped and a diagnosis-required condition and a learning-available condition are satisfied, operating, by the controller, an electric supercharger, detecting, by a manifold pressure sensor, an internal pressure of an intake manifold according to an opening of the EGR valve, and determining, by the controller, a leakage of the EGR valve from the internal pressure of the intake manifold detected by the manifold pressure sensor.

The exemplary method may further include operating the electric supercharger in a positive direction to generate a positive pressure above an atmospheric pressure in the intake manifold, sending an instruction to open the EGR valve to an opening of a different size, stopping the electric supercharger, sending an instruction to close the EGR valve, and determining that the EGR valve leaks when the internal pressure of the intake manifold detected from the manifold pressure sensor differs from a reference pressure by more than a predetermined pressure.

The exemplary method may further include operating the electric supercharger in a reverse direction to generate a negative pressure below an atmospheric pressure in the intake manifold, sending an instruction to open the EGR valve to an opening of a different size, stopping the electric supercharger, sending an instruction to close the EGR valve, and determining that the EGR valve leaks when the internal pressure of the intake manifold detected from the manifold pressure sensor differs from a reference pressure by more than a predetermined pressure.

According to an apparatus for diagnosing an EGR valve and a method thereof according to an exemplary form, normal/abnormal operation and opening of the EGR valve may be precisely diagnosed by operating an electric supercharger to measure an internal pressure of an intake manifold according to the opening of the EGR valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
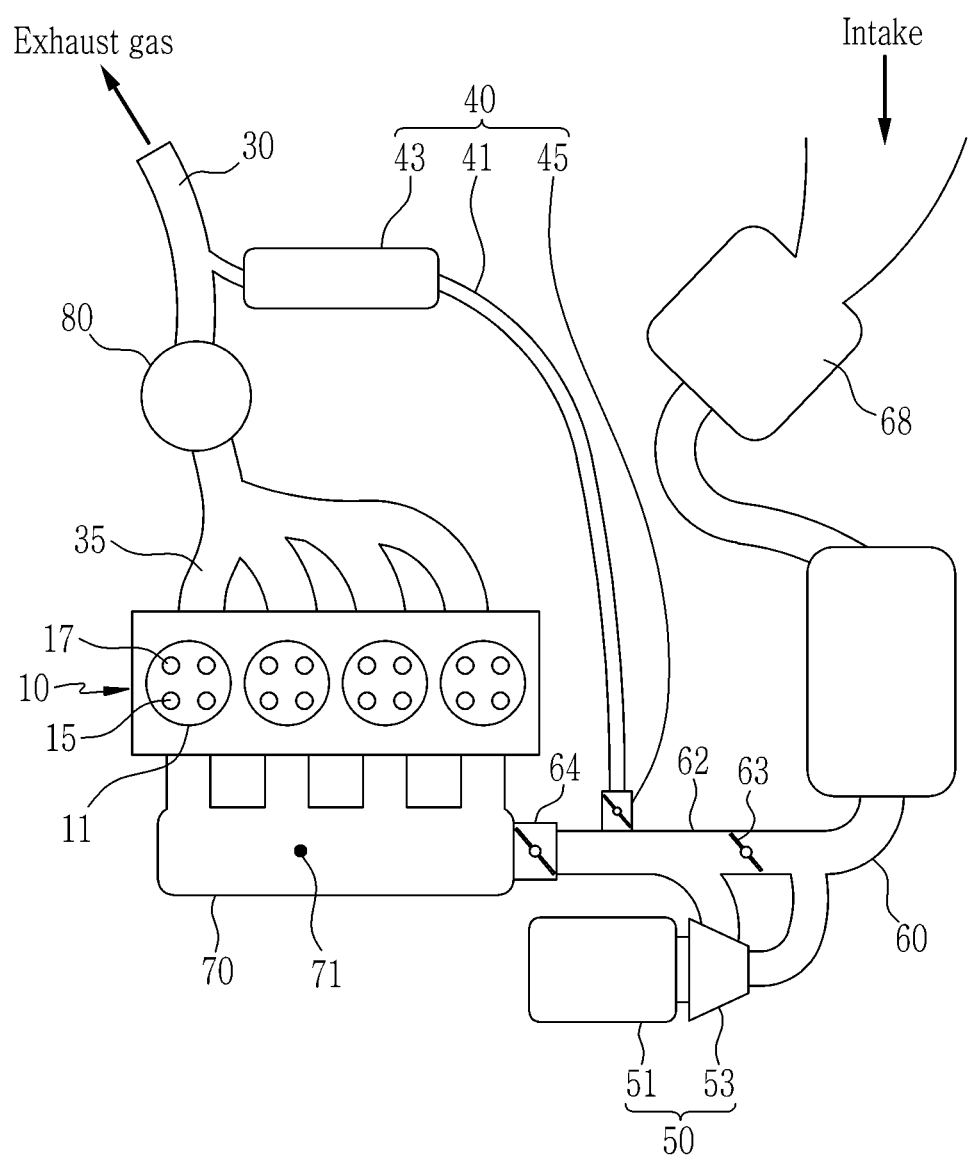
FIG. 1 is a schematic view illustrating an engine system applicable with an apparatus for diagnosing an EGR valve in an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In order to clarify the present disclosure, parts that are not connected to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

Hereinafter, an apparatus for diagnosing an EGR valve in exemplary forms of the present disclosure is described in detail reference to the drawings.

FIG. 1 is a schematic view illustrating an engine system applicable with an apparatus for diagnosing an EGR valve in an exemplary form of the present disclosure. In addition, FIG. 2 is a block diagram illustrating a configuration of an apparatus for diagnosing an EGR valve according to one form of the present disclosure.

First, an engine system applicable with an apparatus for diagnosing an EGR valve in one form of the present disclosure is described in detail. A vehicle applied with the apparatus for diagnosing an EGR valve may be a vehicle having only an internal combustion engine or a hybrid vehicle having both an internal combustion engine and a drive motor.

Figure 2:
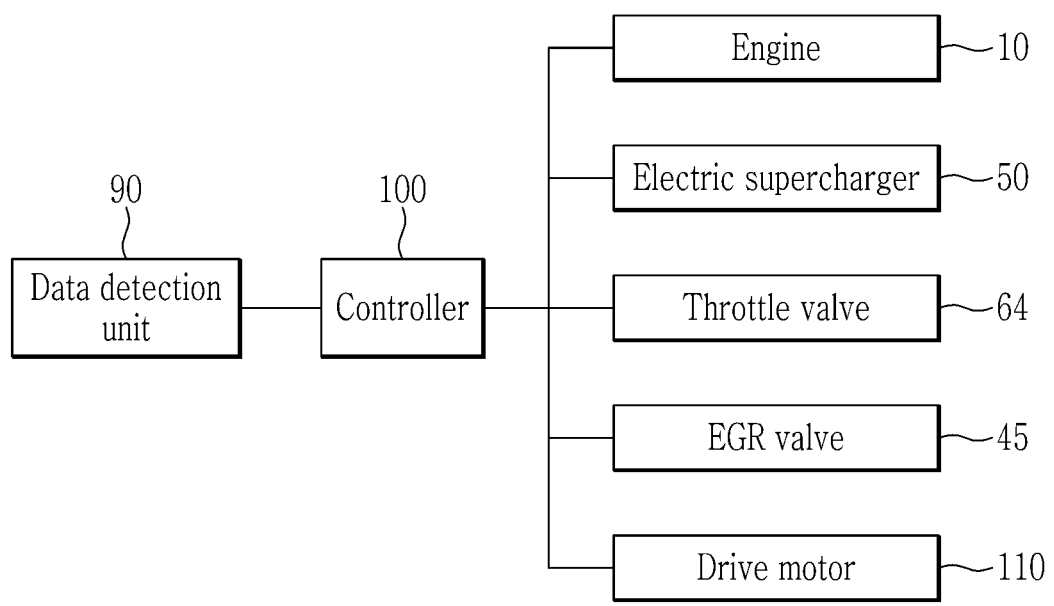
FIG. 2 is a block diagram illustrating a configuration of an apparatus for diagnosing an EGR valve in an exemplary form of the present disclosure.

As shown in FIG. 1 and FIG. 2, an engine system in one form of the present disclosure includes: an engine 10 having a plurality of combustion chambers generating a driving torque by combustion of fuel, an intake line 60 receiving an intake air to be supplied to the combustion chamber, a throttle valve 64 disposed at an upstream side of the intake manifold 70 and adjusting an amount of air supplied to the combustion chamber, an electric supercharger 50 that is disposed at an upstream side of the throttle valve 64 in the intake line 60 and includes a motor 51 and an electric compressor 53 operated by the motor 51 to supply a charged air to the combustion chamber, a catalytic converter 80 purifying the exhaust gas discharged from the combustion chamber, and an exhaust gas recirculation (EGR) apparatus 40 supplying a part of the discharged exhaust gas from the combustion chamber back to the combustion chamber.

The electric supercharger 50 to supply a charged air to the combustion chamber includes: the motor 51 and the electric compressor 53. The electric compressor 53 is operated by the motor 51 and compresses ambient air according to driving conditions to supply the compressed air to the combustion chamber.

The intake line 60 is provided with a bypass line 62 that bypasses a portion of the air supplied to the electric supercharger 50. A bypass valve 63 is mounted on the bypass line 62. An amount of the air supplied to the electric supercharger 50 is adjusted by the bypass valve 63.

The exhaust gas recirculation apparatus 40 includes an EGR line 41 through which a portion (recirculation gas) of the exhaust gas exhausted from the combustion chamber flows, an EGR cooler 43 installed in the EGR line 41, and an EGR valve 45 adjusting a recirculation gas amount.

The EGR line 41 is branched from exhaust line 30, at a downstream side of the catalytic converter 80 for the exhaust gas generated at the combustion chamber, and joined to the intake line 60 at a downstream side of the electric supercharger 50 installed in the intake line 60.

The EGR cooler 43 cools the recirculation gas (EGR gas) flowing through the EGR line 41 and supplies the cooled gas to the combustion chamber.

An engine system according to an exemplary form may be applied to a hybrid vehicle having a drive motor 110 assisting a power of the engine 10.

The drive motor 110 assists the power of the engine 10 and selectively operates as a generator to generate electrical energy. The drive motor 110 is operated using electrical energy charged in a battery (not shown), and the electrical energy generated by the drive motor 110 is charged in the battery.

A data detection unit 90 detects various data used for a method for diagnosing an EGR valve according to an exemplary form, and sends the detected data to a controller 100.

The data detected through the data detection unit 90 may include an internal pressure of an intake manifold, a crankshaft angle, a coolant temperature, and a stop signal of the engine.

For such a purpose, the data detection unit 90 may include a manifold pressure sensor (MAP sensor: manifold absolute pressure sensor) 71 to detect an internal pressure of an intake manifold, a crank angle position sensor (crank angle position sensor) to detect a crankshaft angle, and a coolant temperature sensor to detect the temperature of coolant.

In addition, the engine stop condition may include an ignition key off stop, an engine stall stop, and an idle stop. In one form, the data detection unit 90 may include an ignition key sensor used for detecting the ignition key off stop, an RPM sensor used for detecting the engine stall stop, and/or an accelerator pedal sensor and a brake pedal sensor used for detecting the idle stop.

The controller 100 operates the electric supercharger based on the data detected by the data detection unit 90, and learns on an amount of opening of the EGR valve 45 from an internal pressure of the intake manifold. The controller may determine a fixation of the EGR valve 45, and a leakage of the EGR valve 45 based on the detected data.

For such a purpose, the controller 100 may be provided as at least one processor operable by a predetermined program, where the predetermined program may include instructions to respective steps of a method for diagnosing the EGR valve 45 according to an exemplary form of the present disclosure.

Hereinafter, a method for diagnosing an EGR valve according to an exemplary form is described in detail reference to the drawings.

Figure 4:
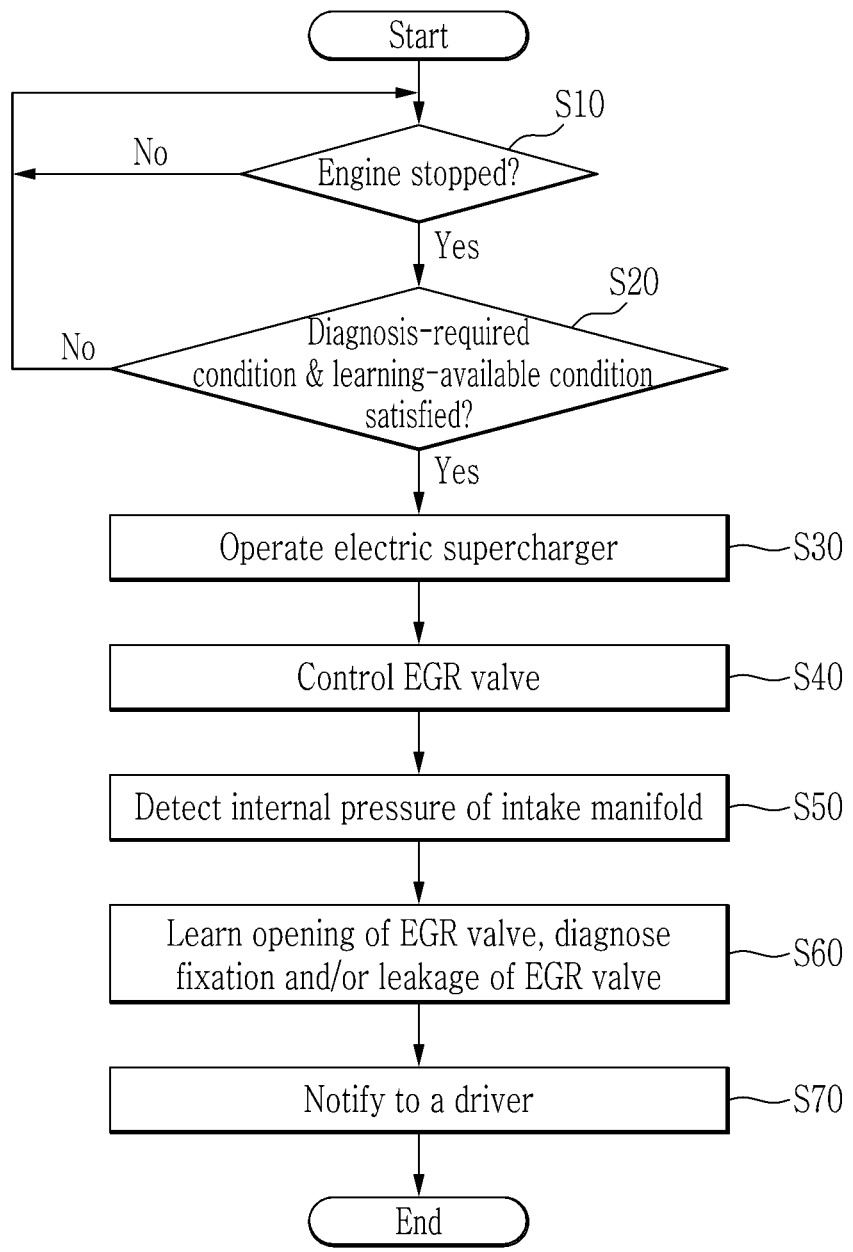
FIG. 4 is a flowchart illustrating a method for diagnosing an EGR valve in an exemplary form of the present disclosure.

FIG. 4 is a flowchart illustrating a method for diagnosing an EGR valve according to an exemplary form of the present disclosure.

As shown in FIG. 4, firstly at step S10, the controller 100 determines whether the engine is stopped based on the data detected by the data detection unit 90.

When the engine is stopped while a vehicle is running (S10—Yes), the controller 100 determines, at step S20, whether a diagnosis-required condition and a learning-available condition of the EGR valve 45 are satisfied.

The diagnosis-required condition may mean that the controller 100 has not diagnosed the EGR valve 45 for a predetermined period. For example, the diagnosis-required condition may be met when the engine of the vehicle is started after being turned off for a long time (e.g., more than 6 hours), or when the EGR valve 45 has not been diagnosed for a long time for a long time (e.g., 5 hours to 6 hours) while the vehicle is running.

The learning-available condition is to determine whether the EGR valve is in a condition that is not appropriate for the diagnosis. It may be set that the learning-available condition is not satisfied, when a coolant temperature is below a predetermined temperature (e.g., 60 degrees Celsius), when a battery voltage is below a predetermined value (e.g., 11 V), when an electrical signal of a principal component (e.g., MAP sensor, EGR valve, or the like) is abnormal (e.g., short circuit, or the like), when the atmospheric pressure is below a predetermined pressure (e.g., 950 HPa), when an ambient air temperature is below a predetermined temperature (e.g., 30 degrees Celsius below zero), When a misfire occurs in the engine or a principal component such as a catalyst is damaged, when a driver is not wearing a safety belt, or when a bonnet or a car door is open.

Figure 3:
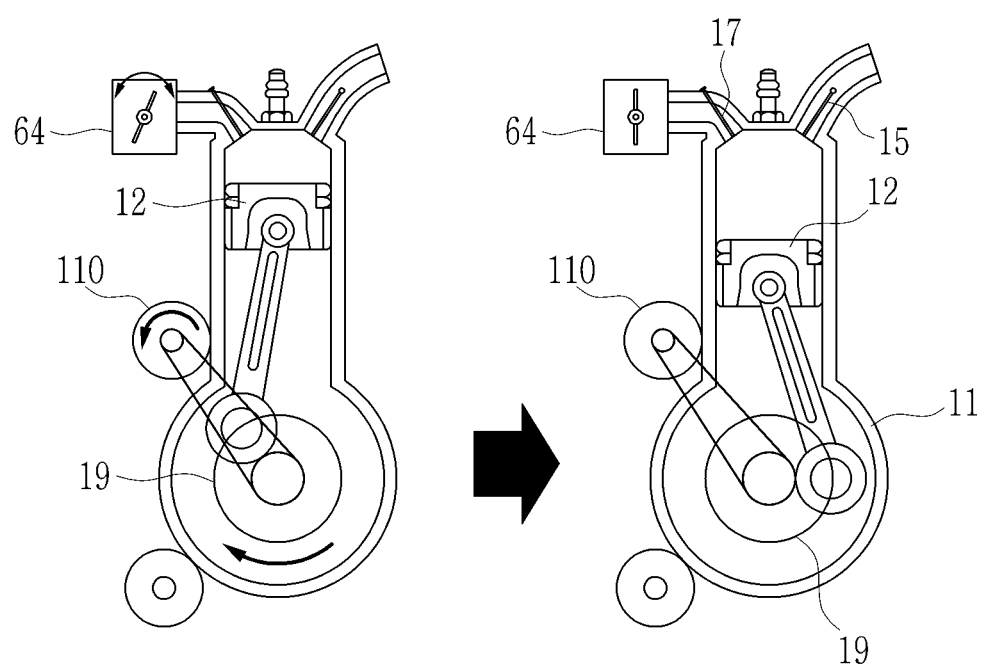
FIG. 3 illustrates a method for adjusting a crank angle in an apparatus for diagnosing an EGR valve in an exemplary form of the present disclosure.

When the diagnosis-required condition and the learning-available condition are satisfied (S20—Yes), the controller 100 adjusts the position of a crankshaft 19 by the drive motor 110 and/or the throttle valve 64 such that the crankshaft angle is positioned at a reference position. At this time, the reference position may be set to be a position where a valve overlap of an intake valve 15 and an exhaust valve 17 of a respective cylinder become minimum (referring to FIG. 3).

Subsequently at step S30, the controller 100 operates the electric supercharger in a positive direction to generate a positive pressure above an atmospheric pressure in the intake manifold 70. Then at step S40, the controller 100 sends an instruction to open the EGR valve 45 for a predetermined period to a first predetermined amount, and then generates a control signal to close the EGR valve 45. At this time, the bypass valve 63 may be closed.

Alternatively, the controller 100 may, before closing the EGR valve 45, generate a control signal to further open the EGR valve 45 to a second predetermined amount different from the first predetermined amount.

Thereafter, at step S60, the controller 100 learns on an opening amount of the EGR valve 45 from the internal pressure of the intake manifold 70, or diagnoses a fixation of the EGR valve 45 and/or a leakage of the EGR valve 45.

In addition, at step S70, when the EGR valve 45 is diagnosed to have a fixation and/or a leakage, the controller 100 may warn a driver of a state of the EGR valve 45 through a center fascia or the like.

In more detail, a process of learning the opening of the EGR valve 45 is described in detail.

Figure 5:
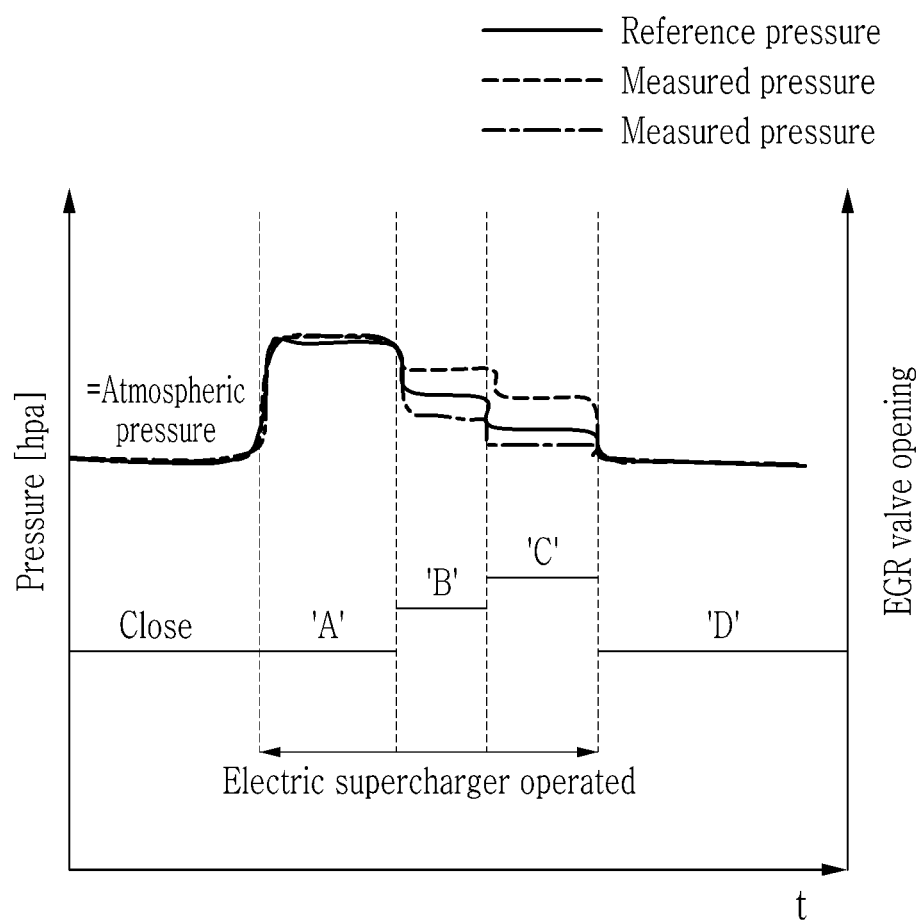
FIG. 5 is a drawing for explaining a method for learning an EGR amount according to an opening of an EGR valve in an exemplary form of the present disclosure.

FIG. 5 is a drawing for explaining illustrates a method for learning on an EGR amount according to the EGR valve 45 opening according to an exemplary form. In FIG. 5, the horizontal axis is a time axis, the left vertical axis is the internal pressure of the intake manifold 70, and the right vertical axis means the opening of the EGR valve 45.

Referring to FIG. 5, while the controller 100 has generated a control signal to close the EGR valve 45, when the electric supercharger operates in the positive direction, then the internal pressure of the intake manifold 70 varies according to the amount of opening of the EGR valve 45. At this time, the reference pressure is the internal pressure of the intake manifold 70 in the case that the EGR valve 45 ideally follows the control signal of the controller 100.

That is, in the case that the EGR valve 45 normally follows the control signal of the controller 100, when a control signal to operate the electric supercharger 50 and to close the EGR valve 45 is generated, the internal pressure of the intake manifold 70 becomes a positive pressure above the atmospheric pressure (refer to 'A' in FIG. 5). When a control signal to open the EGR valve 45 to the first predetermined amount is generated, the internal pressure of the intake manifold 70 becomes a positive pressure lower than when the EGR valve 45 is closed (refer to 'B' in FIG. 5). In addition, when a control signal to open the EGR valve 45 to a second predetermined amount larger than the first predetermined amount is generated, the internal pressure of the intake manifold 70 becomes a positive pressure lower than when the EGR valve 45 is opened to the first predetermined amount (refer to 'C' in FIG. 5). Finally, when the EGR valve 45 is closed and the electric supercharger 50 is stopped, the internal pressure of the intake manifold 70 maintains the atmospheric pressure level (refer to 'D' in FIG. 5).

However, when the EGR valve 45 does not exactly follow the control signal of the controller 100, the internal pressure of the intake manifold 70 becomes different from the reference pressure. That is, in the case that the controller 100 has generated a control signal to open to the first predetermined amount, when the internal pressure of the intake manifold 70 measured by the manifold pressure sensor 71 differs from the reference pressure, it may be determined that the EGR valve 45 does not exactly follow the control signal of the controller 100.

Therefore, the controller 100 generates a control signal to open the EGR valve 45 for a predetermined period to a second predetermined amount different from the first predetermined amount, and compares the internal pressure of the intake manifold 70 with the reference pressure.

In addition, the controller 100 may determine a compensation value of the opening of the EGR valve 45 as a ratio of differential pressures, i.e., a ratio between a differential pressure between the reference pressure and the internal pressure of the intake manifold 70 measured when the controller 100 generated a control signal to open the EGR valve 45 to the first predetermined amount and a differential pressure between the reference pressure and the internal pressure of the intake manifold 70 measured when the controller 100 generated a control signal to open the EGR valve 45 to the second predetermined amount.

At this time, the EGR amount may be calculated by the following equation.

EGR amount=effective cross-section of EGR line*compensation value*pressure difference between upstream and downstream sides of EGR valve*flow function*temperature of EGR gas  [Equation 1]:

By setting the compensation value of the opening of the EGR valve in Equation 1 to the ratio of the differential pressures, the controller 100 may precisely calculate the EGR amount.

A process of diagnosing the fixation of the EGR valve according to an exemplary form is described in detail.

Figure 6:
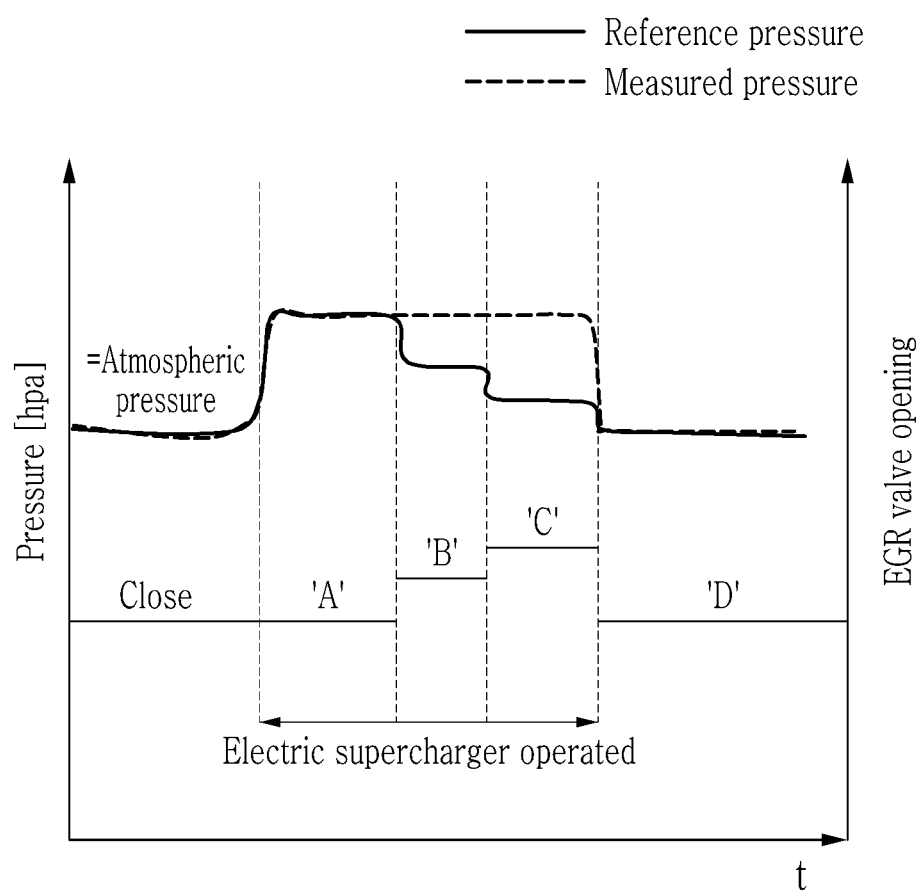
FIG. 6 is a drawing for explaining a method for diagnosing a fixation of an EGR valve in an exemplary form of the present disclosure.

FIG. 6 is a drawing for explaining a method for diagnosing a fixation of an EGR valve according to an exemplary form. In FIG. 6, the horizontal axis is a time axis, the left vertical axis is the internal pressure of the intake manifold 70, and the right vertical axis means the opening of the EGR valve.

Referring to FIG. 6, while the controller 100 has generated a control signal to close the EGR valve 45, the controller 100 operates the electric supercharger 50 in the positive direction to generate a positive pressure above the atmospheric pressure in the intake manifold 70 (refer to 'A' in FIG. 6). At this time, the bypass valve 63 is closed.

In addition, the controller 100 generates a control signal to open the EGR valve 45 to an opening of a different size (i.e., different amounts of opening). For example, the controller 100 may, after generating a control signal to open the EGR valve 45 to the first predetermined opening amount (refer to 'B' in FIG. 6), generate a control signal to open the EGR valve 45 to the second predetermined opening amount larger than the first predetermined opening amount (refer to 'C' in FIG. 6).

Thereafter, the controller 100 generates a control signal to close the EGR valve 45, and then stops the electric supercharger 50 (refer to 'D' in FIG. 6).

When the internal pressure of the intake manifold 70 measured by the manifold pressure sensor is not varied even though the control signal to open the EGR valve 45 to the opening of the different size is generated, the controller 100 may determine that the EGR valve 45 is fixated (i.e., stuck).

Therefore, the controller 100 may notify a driver, e.g., by using an alarm or the like, through a center fascia or the like installed in the vehicle, that the EGR valve 45 has an error.

A process of diagnosing a leakage of the EGR valve according to an exemplary form will be described in detail.

Figure 7:
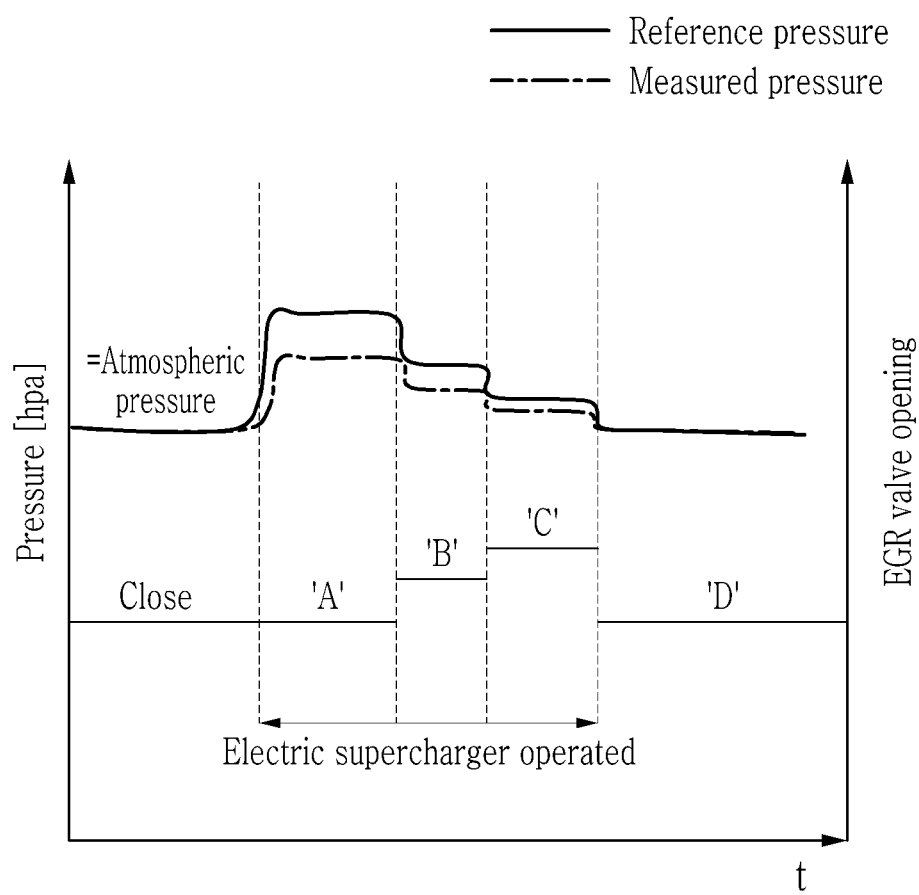
FIG. 7 is a drawing for explaining a method for diagnosing a leakage of an EGR valve in an exemplary form of the present disclosure.

FIG. 7 is a drawing for explaining a method for diagnosing a leakage of an EGR valve according to an exemplary form. In FIG. 7, the horizontal axis is a time axis, the left vertical axis is the internal pressure of the intake manifold 70, and the right vertical axis means the opening of the EGR valve.

Referring to FIG. 7, while the controller 100 has generated a control signal to close the EGR valve 45, the controller 100 operates the electric supercharger 50 in the positive direction to generate a positive pressure above the atmospheric pressure in the intake manifold 70 (refer to 'A' in FIG. 7).

In addition, the controller 100 generates a control signal to open the EGR valve 45 to an opening of a different size. For example, the controller 100 may, after generating a control signal to open the EGR valve 45 to the first predetermined amount (refer to 'B' in FIG. 7), generate a control signal to open the EGR valve 45 to the second predetermined amount larger than the first predetermined amount (refer to 'C' in FIG. 7).

Thereafter, the controller 100 generates a control signal to close the EGR valve 45, and then stops the electric supercharger 50 (refer to 'D' in FIG. 7).

When the internal pressure of the intake manifold 70 detected by the manifold pressure sensor differs from the reference pressure by more than a predetermined pressure while the electric supercharger 50 is operated and the EGR valve 45 is controlled to be open, the controller 100 may determine that the EGR valve 45 leaks.

Therefore, the controller 100 may notify a driver, e.g., by using an alarm or the like, through a center fascia or the like installed in the vehicle, that the EGR valve 45 has an error.

Hereinafter, a method of learning the opening of the EGR valve, diagnosing of the fixation, and diagnosing of the leakage method according to another exemplary form is described in detail.

A process of learning the opening of the EGR valve is described in detail.

Figure 8:
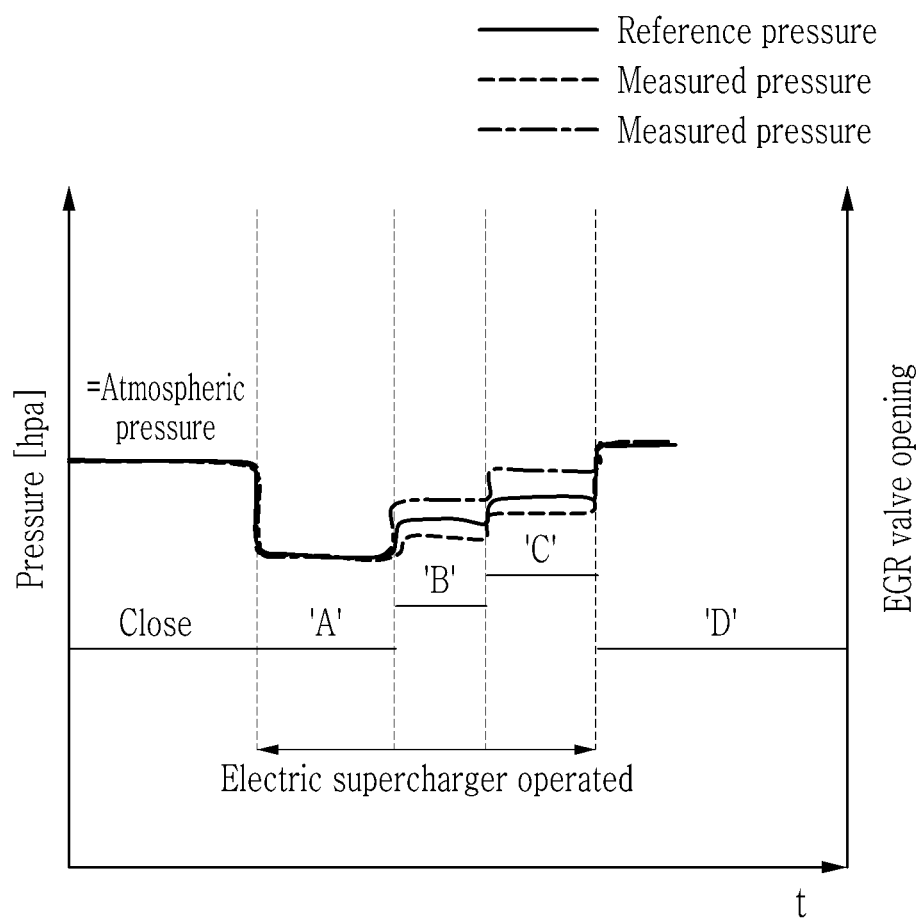
FIG. 8 is a drawing for explaining a method for diagnosing and learning an EGR amount according to an opening of an EGR valve in another exemplary form of the present disclosure.

FIG. 8 is a drawing for explaining a method for diagnosing and learning an EGR amount according to an opening of the EGR valve 45 according to another exemplary form. In FIG. 8, the horizontal axis is a time axis, the left vertical axis is the internal pressure of the intake manifold 70, and the right vertical axis means the opening of the EGR valve 45.

Referring to FIG. 8, while the controller 100 has generated a control signal to close the EGR valve 45, when the electric supercharger operates in the reverse direction, the internal pressure of the intake manifold 70 according to the opening of the EGR valve 45 varies. At this time, the reference pressure is the internal pressure of the intake manifold 70 in the case that the EGR valve 45 ideally follows the control signal of the controller 100.

That is, in the case that the EGR valve 45 normally follows the control signal of the controller 100, when a control signal to operate the electric supercharger 50 and to close the EGR valve 45 is generated, the internal pressure of the intake manifold 70 becomes a negative pressure below the atmospheric pressure (refer to 'A' in FIG. 8). When a control signal to open the EGR valve 45 to the first predetermined amount is generated, the internal pressure of the intake manifold 70 becomes a negative pressure higher than when the EGR valve 45 is closed (refer to 'B' in FIG. 8). In addition, when a control signal to open the EGR valve 45 to a second predetermined amount larger than the first predetermined amount is generated, the internal pressure of the intake manifold 70 becomes a negative pressure higher than when the EGR valve 45 is opened to the first predetermined amount (refer to 'C' in FIG. 8). Finally, when the EGR valve 45 is closed and the electric supercharger 50 is stopped, the internal pressure of the intake manifold 70 maintains the atmospheric pressure level (refer to 'D' in FIG. 8).

However, when the EGR valve 45 does not exactly follow the control signal of the controller 100, the internal pressure of the intake manifold 70 becomes different from the reference pressure. That is, in the case that the controller 100 has generated a control signal to open the first predetermined amount, when the internal pressure of the intake manifold 70 measured by the manifold pressure sensor differs from the reference pressure, it may be concluded that the EGR valve 45 does not exactly follow the control signal of the controller 100.

The controller 100 generates a control signal to open the EGR valve 45 for a predetermined period to a second predetermined amount different from the first predetermined amount, and compares the internal pressure of the intake manifold 70 with the reference pressure.

In addition, the controller 100 may determine a compensation value of the opening of the EGR valve 45 based on a ratio of differential pressures, i.e., a ratio between a differential pressure between the reference pressure and the internal pressure of the intake manifold 70 measured when the controller 100 generated a control signal to open the EGR valve 45 to the first predetermined opening amount and a differential pressure between the reference pressure and the internal pressure of the intake manifold 70 measured when the controller 100 generated a control signal to open the EGR valve 45 to the second predetermined opening amount.

The EGR amount may be calculated by the following equation.

$$\text{EGR amount} = \text{effective cross-section of EGR line} * \text{compensation value} * \text{pressure difference between upstream and downstream sides of EGR valve} * \text{flow function} * \text{temperature of EGR gas} \quad \text{[Equation 1]}$$

By setting the compensation value of the opening of the EGR valve in Equation 1 to the ratio of the differential pressures, the controller 100 may precisely calculate the EGR amount.

A process of diagnosing the fixation of the EGR valve according to another exemplary form is described in detail.

Figure 9:
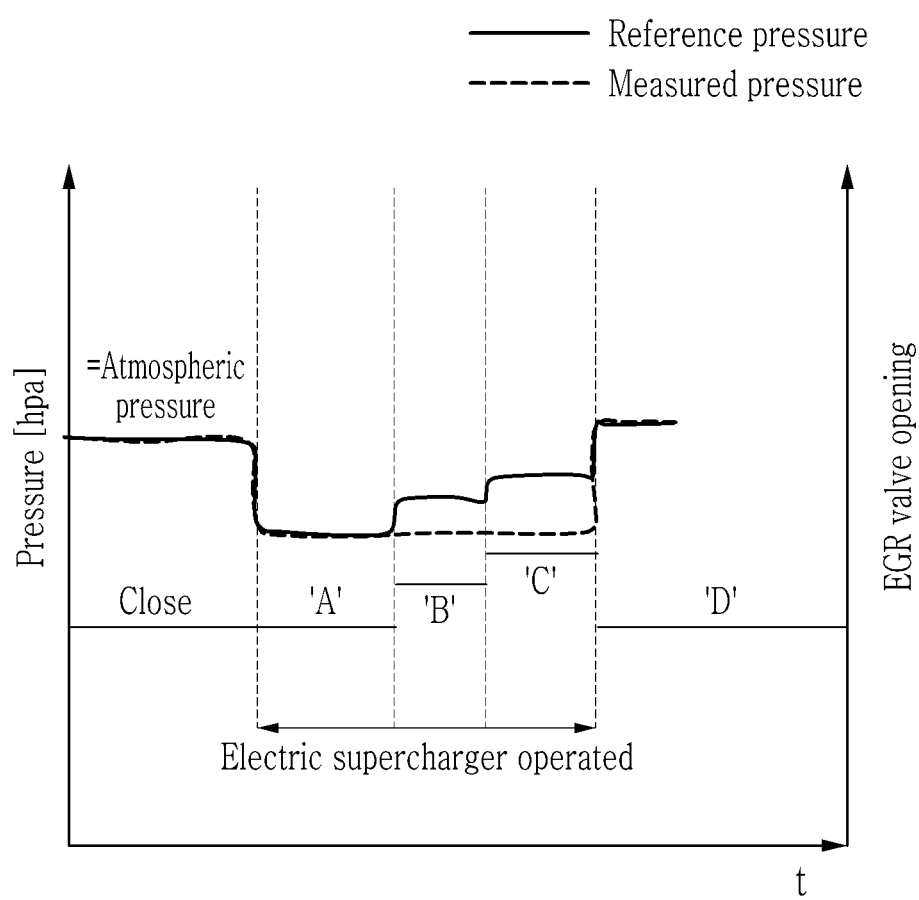
FIG. 9 is a drawing for explaining a method for diagnosing a fixation of an EGR valve in another exemplary form of the present disclosure.

FIG. 9 is a drawing for explaining a method for diagnosing a fixation of an EGR valve according to an exemplary form. In FIG. 9, the horizontal axis is a time axis, the left vertical axis is the internal pressure of the intake manifold 70, and the right vertical axis means the opening of the EGR valve.

Referring to FIG. 9, while the controller 100 has generated a control signal to close the EGR valve 45, the controller 100 operates the electric supercharger 50 in a reverse direction to generate a negative pressure below the atmospheric pressure in the intake manifold 70 (refer to 'A' in FIG. 9).

In addition, the controller 100 generates a control signal to open the EGR valve 45 to an opening of a different size. For example, the controller 100 may, after generating a control signal to open the EGR valve 45 to the first predetermined amount (refer to 'B' in FIG. 9), generate a control signal to open the EGR valve 45 to the second predetermined amount larger than the first predetermined amount (refer to 'C' in FIG. 9).

Thereafter, the controller 100 generates a control signal to close the EGR valve 45, and then stops the electric supercharger 50 (refer to 'D' in FIG. 9).

When the internal pressure of the intake manifold 70 measured by the manifold pressure sensor is not varied even though the control signal to open the EGR valve 45 to the opening of the different size is generated, the controller may determine that the EGR valve 45 is stuck.

Therefore, the controller 100 may notify a driver, e.g., by using an alarm or the like, through a center fascia or the like installed in the vehicle, that the EGR valve 45 has an error.

A process of diagnosing a leakage of the EGR valve according to another exemplary form is described in detail.

Figure 10:
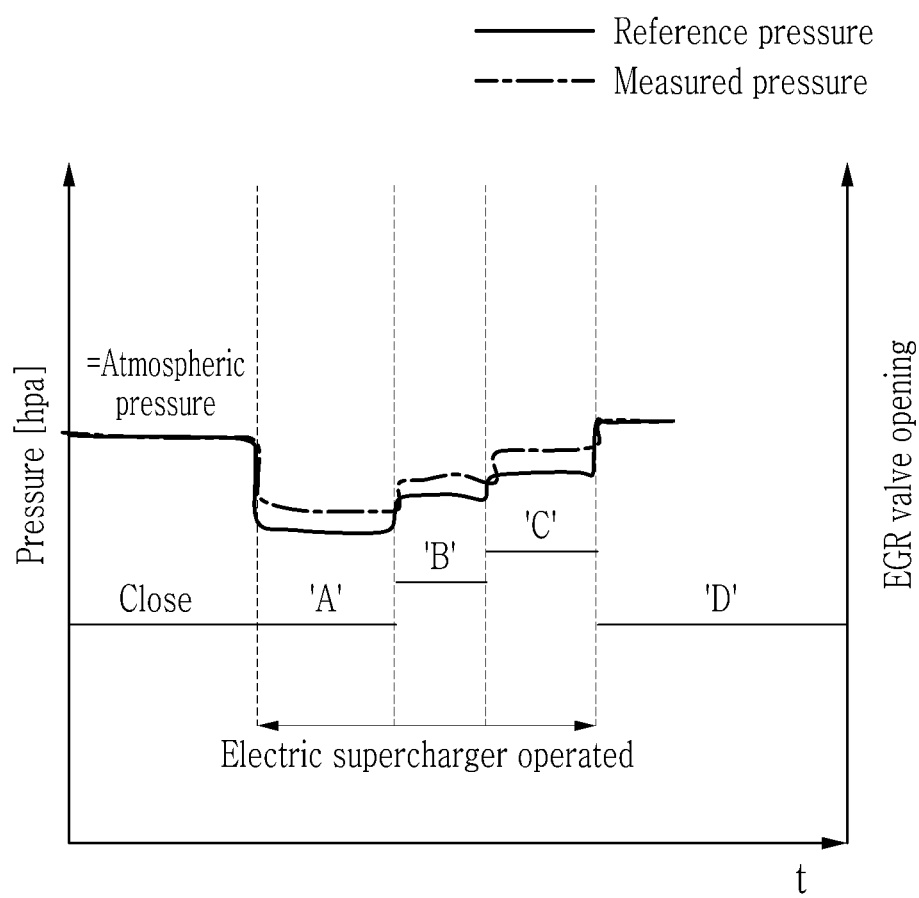
FIG. 10 is a drawing for explaining a method for diagnosing a leakage of an EGR valve in another exemplary form of the present disclosure.

FIG. 10 is a drawing for explaining a method for diagnosing a leakage of an EGR valve according to an exemplary form. In FIG. 10, the horizontal axis is a time axis, the left vertical axis is the internal pressure of the intake manifold 70, and the right vertical axis means the opening of the EGR valve.

Referring to FIG. 10, while the controller 100 has generated a control signal to close the EGR valve 45, the controller 100 operates the electric supercharger 50 in the reverse direction to generate a negative pressure below the atmospheric pressure in the intake manifold 70 (refer to 'A' in FIG. 10).

In addition, the controller 100 generates a control signal to open the EGR valve 45 to an opening of a different size. For example, the controller 100 may, after generating a control signal to open the EGR valve 45 to the first predetermined amount (refer to 'B' in FIG. 10), generate a control signal to open the EGR valve 45 to the second predetermined amount larger than the first predetermined amount (refer to 'C' in FIG. 10).

Thereafter, the controller 100 generates a control signal to close the EGR valve 45, and then stops the electric supercharger 50 (refer to 'D' in FIG. 10).

When the internal pressure of the intake manifold 70 detected by the manifold pressure sensor differs from the reference pressure by more than a predetermined pressure while the electric supercharger 50 is operated and the EGR valve 45 is controlled to be open, the controller 100 may determine that the EGR valve 45 leaks.

Therefore, the controller 100 may notify a driver, e.g., by using an alarm or the like, through a center fascia or the like installed in the vehicle, that the EGR valve 45 has an error.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

DESCRIPTION OF SYMBOLS

10: engine
11: combustion chamber
15: intake valve
17: exhaust valve
30: exhaust line
35: exhaust manifold
40: exhaust gas recirculation apparatus
41: EGR line
43: EGR cooler
45: EGR valve
50: the electric supercharger
51: motor
53: electric compressor
60: intake line
62: bypass line
63: bypass valve
64: throttle valve
68: air cleaner
70: intake manifold
71: manifold pressure sensor
80: catalytic converter
90: data detection unit
100: controller
110: drive motor

What is claimed is:

1. An apparatus for diagnosing an exhaust gas recirculation (EGR) valve, comprising:
an EGR apparatus including:
an EGR line connecting an exhaust line and an intake line of an engine, and
an EGR valve installed in the EGR line;
an electric supercharger installed in the intake line and configured to change an internal pressure of an intake manifold;
a manifold pressure sensor configured to measure the internal pressure of the intake manifold; and
a controller configured to, when the engine is stopped while a vehicle is running, learn on an amount of opening of the EGR valve, diagnose a fixation of the EGR valve and a leakage of the EGR valve, based on the measured internal pressure of the intake manifold.

2. The apparatus of claim 1, wherein the controller is configured to learn on the amount of opening of the EGR valve, diagnose the fixation of the EGR valve and the leakage of the EGR valve after positioning a crank angle to a reference position when the engine is stopped.

3. The apparatus of claim 1, wherein the controller is configured to:
operate the electric supercharger in a positive direction to generate a positive pressure above an atmospheric pressure in the intake manifold,
open the EGR valve for a first predetermined period with a first predetermined opening amount and then close the EGR valve after the first predetermined period expires, and
calculate a first pressure difference by comparing an internal pressure of the intake manifold measured during the first predetermined period with a first reference pressure such that the controller learns on the amount of opening of the EGR valve.

4. The apparatus of claim 3, wherein the controller is configured to:
open the EGR valve for a second predetermined period with a second predetermined opening amount and then close the EGR valve after the second predetermined period expires, where the second predetermined opening amount is different from the first predetermined opening amount,
calculate a second pressure difference by comparing an internal pressure of the intake manifold measured during the second predetermined period with a second reference pressure,
calculate a ratio of the first pressure difference to the second pressure difference, and
determine a compensation value of the opening of the EGR valve based on the calculated ratio of the first pressure difference to the second pressure difference.

5. The apparatus of claim 1, wherein the controller is configured to determine that the EGR valve is fixated when the measured internal pressure of the intake manifold is not varied while the electric supercharger is operated in a positive direction to generate a positive pressure above an atmospheric pressure in the intake manifold and an instruction to open the EGR valve to different amounts of opening is sent.

6. The apparatus of claim 1, wherein the controller is configured to determine that the EGR valve leaks when the measured internal pressure of the intake manifold differs from a reference pressure by more than a predetermined pressure while the electric supercharger is operated in a positive direction to generate a positive pressure above an atmospheric pressure in the intake manifold and an instruction to open the EGR valve to different amounts of opening is sent.

7. The apparatus of claim 1, wherein the controller is configured to:
operate the electric supercharger in a reverse direction and generate a negative pressure below an atmospheric pressure in the intake manifold,
open the EGR valve for a first predetermined period with a first predetermined opening amount,
close the EGR valve after the first predetermined period expires, and
compare an internal pressure of the intake manifold measured during the first predetermined period with a first reference pressure so as to learn on the amount of opening of the EGR valve.

8. The apparatus of claim 7, wherein the controller is configured to:
   open the EGR valve for a second predetermined period with a second predetermined opening amount,
   close the EGR valve after the second predetermined period expires, where the second predetermined opening amount is different from the first predetermined opening amount,
   calculate a first pressure difference by comparing the internal pressure of the intake manifold measured during the first predetermined period with the first reference pressure,
   calculate a second pressure difference by comparing an internal pressure of the intake manifold measured during the second predetermined period with a second reference pressure,
   calculate a ratio of the first pressure difference to the second pressure difference, and
   determine a compensation value of the opening of the EGR valve based on the calculated ratio of the first pressure difference to the second pressure difference.

9. The apparatus of claim 1, wherein the controller is configured to determine that the EGR valve is fixated when the measured internal pressure of the intake manifold detected from the manifold pressure sensor is not varied while the electric supercharger is operated in a reverse direction to generate a negative pressure below an atmospheric pressure in the intake manifold and an instruction to open the EGR valve to different amounts of opening is sent.

10. The apparatus of claim 1, wherein the controller is configured to determine that the EGR valve leaks when the measured internal pressure of the intake manifold detected from the manifold pressure sensor differs from a reference pressure by more than a predetermined pressure while the electric supercharger is operated in a reverse direction to generate a negative pressure below an atmospheric pressure in the intake manifold and an instruction to open the EGR valve to different amounts of opening is sent.

11. A method for diagnosing an exhaust gas recirculation (EGR) valve provided in an EGR apparatus, the method comprising:
   determining, by a controller, whether an engine is stopped while a vehicle is running;
   operating, by the controller, an electric supercharger configured to change an internal pressure of an intake manifold;
   measuring, by a manifold pressure sensor, the internal pressure of the intake manifold which varies based on an amount of opening of the EGR valve; and
   learning, by the controller, on the amount of opening of the EGR valve based on the measured internal pressure of the intake manifold.

12. The method of claim 11, further comprising:
   operating, by the controller, the electric supercharger in a positive direction to generate a positive pressure above an atmospheric pressure in the intake manifold;
   opening, by the controller, the EGR valve for a first predetermined period with a first predetermined opening amount;
   closing, by the controller, the EGR valve after the first predetermined period expires; and
   learning on the amount of opening of the EGR valve by comparing the measured internal pressure of the intake manifold with a first reference pressure.

13. The method of claim 12, further comprising:
   opening, by the controller, the EGR valve for a second predetermined period with a second predetermined opening amount which is different from the first predetermined opening amount;
   closing, by the controller, the EGR valve after the second predetermined period expires;
   calculating, by the controller, a first pressure difference by comparing an internal pressure of the intake manifold measured during the first predetermined period with a first reference pressure, and a second pressure difference by comparing an internal pressure of the intake manifold measured during the second predetermined period with a second reference pressure; and
   determining, by the controller, a compensation value of the opening of the EGR valve as a ratio of the first pressure difference to the second pressure difference.

14. The method of claim 11, further comprising:
   operating, by the controller, the electric supercharger in a reverse direction to generate a negative pressure below an atmospheric pressure in the intake manifold;
   opening, by the controller, the EGR valve for a first predetermined period with a first predetermined opening amount;
   closing, by the controller, the EGR valve after the first predetermined period expires; and
   learning, by the controller, on the amount of opening of the EGR valve by comparing an internal pressure of the intake manifold measured during the first predetermined period with a first reference pressure.

15. The method of claim 14, further comprising:
   opening, by the controller, the EGR valve for a second predetermined period with a second predetermined opening amount which is different from the first predetermined opening amount;
   closing, by the controller, the EGR valve after the second predetermined period expires;
   comparing the measured internal pressure of the intake manifold during the second predetermined period with a second reference pressure; and
   determining, by the controller, a compensation value of the opening of the EGR valve based on a first pressure difference between the first reference pressure and the internal pressure of the intake manifold measured when the EGR valve is open with the first predetermined opening amount, and a second pressure difference between the second reference pressure and the internal pressure of the intake manifold measured when the EGR valve is open with the second predetermined opening amount.

16. A method for diagnosing an exhaust gas recirculation (EGR) valve provided in an EGR apparatus, the method comprising:
   determining, by a controller, whether an engine is stopped and a diagnosis-required condition and a learning-available condition are satisfied;
   operating, by the controller, an electric supercharger configured to change an internal pressure of an intake manifold;
   measuring, by a manifold pressure sensor, the internal pressure of the intake manifold which varies based on an amount of opening of the EGR valve; and
   determining, by the controller, a fixation of the EGR valve based on the measured internal pressure of the intake manifold.

17. The method of claim 16, further comprising:
   operating, by the controller, the electric supercharger in a positive direction to generate a positive pressure above an atmospheric pressure in the intake manifold;

sending, by the controller, an instruction to open the EGR valve to different amounts of opening;

stopping, by the controller, the electric supercharger;

sending, by the controller, an instruction to close the EGR valve; and determining, by the controller, that the EGR valve is fixated when the measured internal pressure of the intake manifold is not varied after the instruction to open the EGR valve to the different amounts of opening is sent.

18. The method of claim 16, further comprising:

operating, by the controller, the electric supercharger in a reverse direction to generate a negative pressure below an atmospheric pressure in the intake manifold;

sending, by the controller, an instruction to open the EGR valve to different amounts of opening;

stopping, by the controller, the electric supercharger;

sending, by the controller, an instruction to close the EGR valve; and determining, by the controller, that the EGR valve is fixated when the measured internal pressure of the intake manifold is not varied after the instruction to open the EGR valve to the different amounts of opening is sent.

19. A method for diagnosing an exhaust gas recirculation (EGR) valve provided in an EGR apparatus, the method comprising:

determining, by a controller, whether an engine is stopped and a diagnosis-required condition and a learning-available condition are satisfied;

operating, by the controller, an electric supercharger configured to change an internal pressure of an intake manifold;

measuring, by a manifold pressure sensor, the internal pressure of the intake manifold which varies based on an amount of opening of the EGR valve; and determining, by the controller, a leakage of the EGR valve based on the measured internal pressure of the intake manifold.

20. The method of claim 19, further comprising:

operating, by the controller, the electric supercharger in a positive direction to generate a positive pressure above an atmospheric pressure in the intake manifold;

sending, by the controller, an instruction to open the EGR valve to different amounts of opening;

stopping, by the controller, the electric supercharger;

sending, by the controller, an instruction to close the EGR valve; and determining, by the controller, that the EGR valve leaks when the measured internal pressure of the intake manifold differs from a reference pressure by more than a predetermined pressure.

21. The method of claim 19, further comprising:

operating, by the controller, the electric supercharger in a reverse direction to generate a negative pressure below an atmospheric pressure in the intake manifold;

sending, by the controller, an instruction to open the EGR valve to different amounts of opening;

stopping, by the controller, the electric supercharger;

sending, by the controller, an instruction to close the EGR valve; and determining, by the controller, that the EGR valve leaks when the measured internal pressure of the intake manifold differs from a reference pressure by more than a predetermined pressure.

* * * * *